(12) United States Patent
Li

(10) Patent No.: US 6,340,142 B1
(45) Date of Patent: Jan. 22, 2002

(54) CLAMP DEVICE FOR HOLDING A RADAR SENSOR ON A BUMPER OF AN AUTOMOBILE

(76) Inventor: Shih-Hsiung Li, 8th Fl.-1, No. 23, Sec. 1, Harng-Chou S. Rd., Taipei (TW)

( * ) Notice: Subject to any disclaimer, the term of this patent is extended or adjusted under 35 U.S.C. 154(b) by 0 days.

(21) Appl. No.: 09/613,285

(22) Filed: Jul. 10, 2000

(51) Int. Cl.[7] .................................................. F16L 3/08
(52) U.S. Cl. ..................................... 248/74.1; 248/313
(58) Field of Search ............................ 248/309.1, 313, 248/316.8, 229.15, 229.24, 74.1, 74.5, 49, 51, 52; 340/904

(56) References Cited

U.S. PATENT DOCUMENTS 3,310,264 A * 3/1967 Appleton .................. 248/74.1
3,526,381 A * 9/1970 Pepe ......................... 248/74.1
6,234,277 B1 * 5/2001 Kaczmarek ............. 248/74.1 X

* cited by examiner

Primary Examiner—Ramon O. Ramirez
(74) Attorney, Agent, or Firm—Jones, Tullar & Cooper, P.C.

(57) ABSTRACT

A clamp device is provided for holding a radar sensor on a bumper of an automobile. The clamp device includes a C-shaped body having a pair of end lips extending therefrom and a chamber defined therein for accommodating the radar sensor. The lips have aligned mounting holes to receive a bolt and nut for fixing the C-shaped body on the bumper of the automobile.

6 Claims, 4 Drawing Sheets

CLAMP DEVICE FOR HOLDING A RADAR SENSOR ON A BUMPER OF AN AUTOMOBILE

BACKGROUND OF THE INVENTION

1. Field of the Invention

The present invention relates to a clamp device and, more particularly, to a clamp device for holding a radar sensor on a bumper of an automobile.

2. Description of Related Art

More and more automobiles are now equipped with radar modules on their bumpers especially rear bumpers, to detect obstacles behind when the automobile is being reversed. Additionally, it has become very fashionable to fit additional cylindrical bumpers as they provide extra safety in collisions.

As shown in FIG. 4, such a radar module typically includes a C-shaped clip (40) carrying a radar sensor (41) pivotally connected thereto. Furthermore, the clip (40) includes a clamping screw (42).

Referring to FIG. 5, in the conventional radar module, however, the C-shaped clip (40) is made of metal, and may rotate relative to an additional metal bumper (43) due to insufficient grip therebetween. It is particularly found that the radar sensor (41) will rotate with respect to the C-shaped clip (40) if the automobile is travelling on a rough road. As a result, the radar sensor (41) may face downward to a road surface, causing an alarm instrument associated with the sensor to beep repeatedly and uselessly.

Therefore, it is an objective of the invention to provide a clamp device for holding a radar sensor on a bumper of an automobile to mitigate and/or obviate the aforementioned problems.

SUMMARY OF THE INVENTION

The object of the present invention is to provide a clamp device for securely holding a radar sensor on a bumper of an automobile.

Other objects, advantages and novel features of the invention will become more apparent from the following detailed description when taken in conjunction with the accompanying drawings.

DETAILED DESCRIPTION OF THE PREFERRED EMBODIMENT

Figure 1:
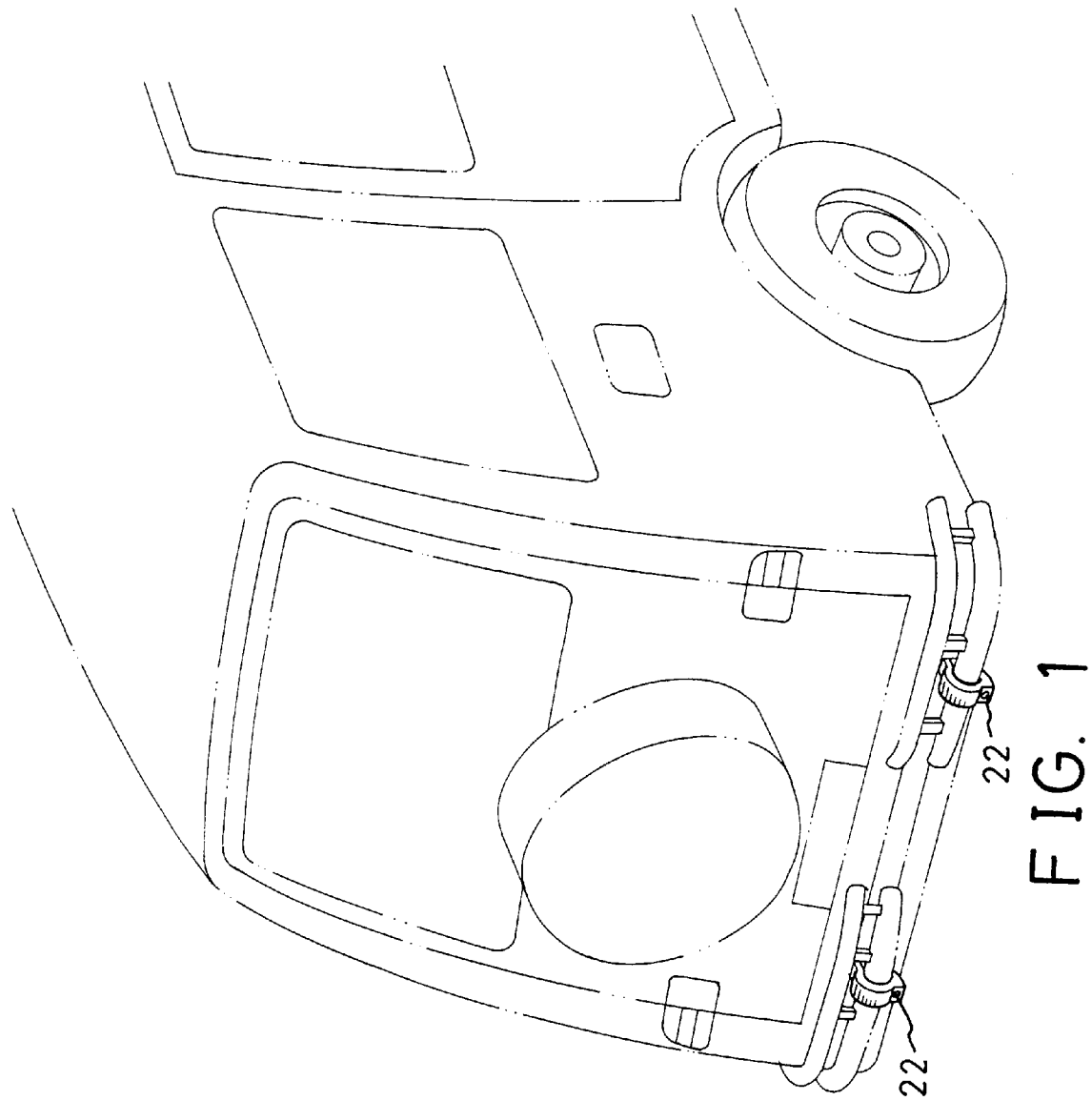
FIG. 1 is a perspective view of clamp devices in accordance with the present invention for holding radar sensors on a bumper of an automobile.

Referring to FIG. 1, a clamp device in accordance with the present invention is provided for holding a radar sensor (22) on a bumper, especially an additional rear bumper (20), of an automobile.

Figure 2:
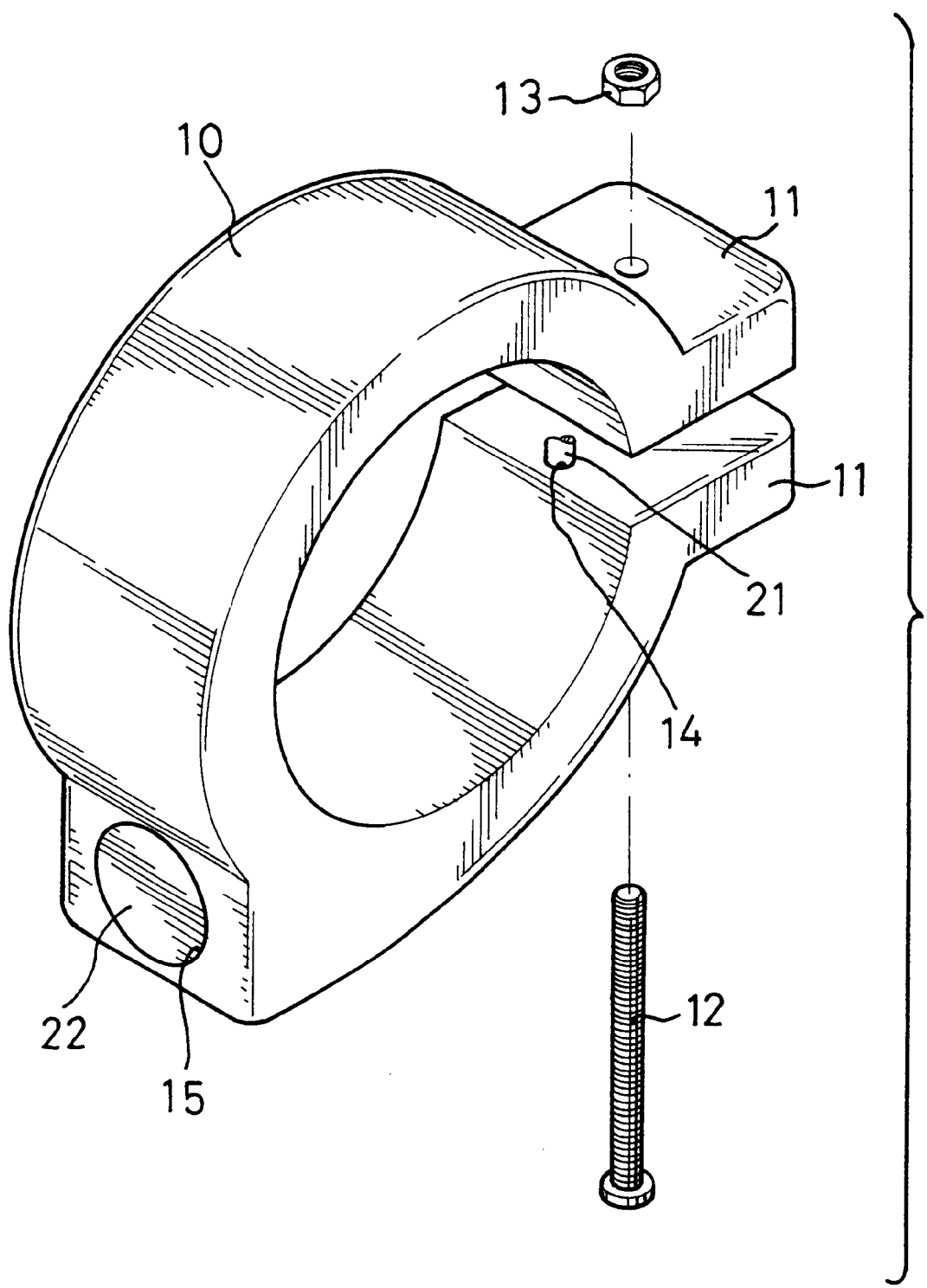
FIG. 2 is a detailed cross-sectional view of the clamp device of FIG. 1.
Figure 3:
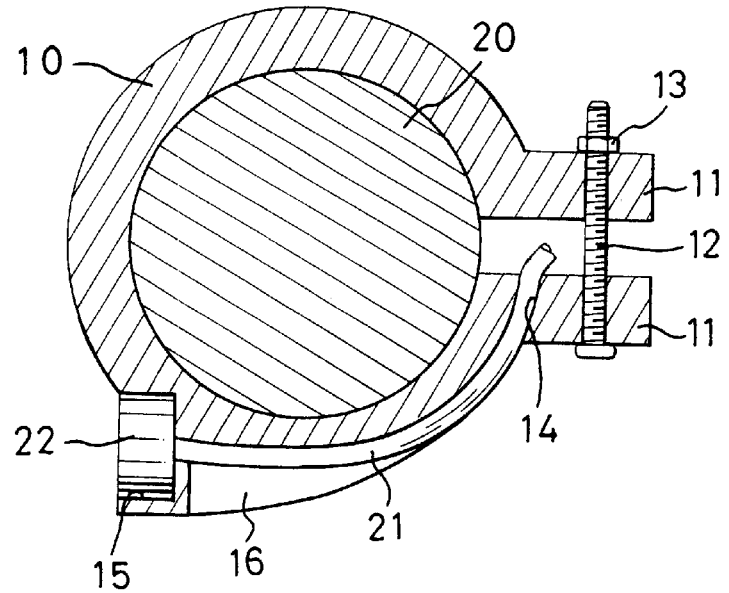
FIG. 3 is a perspective view of two of the clamp devices of FIG. 1, fitted to an automobile shown in phantom lines.
Figure 5:
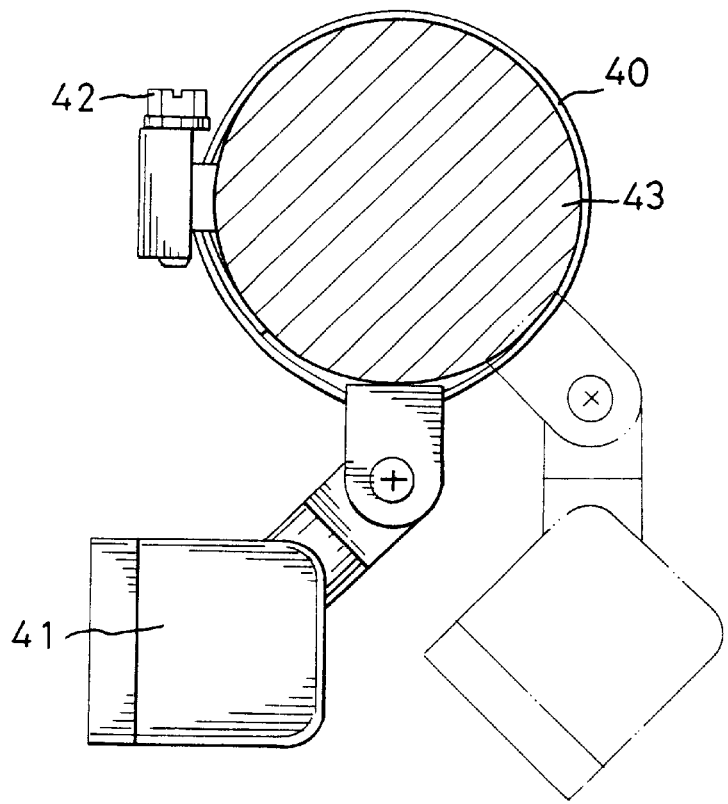
FIG. 5 a cross sectional view of the conventional radar module of FIG. 4.
Figure 4:
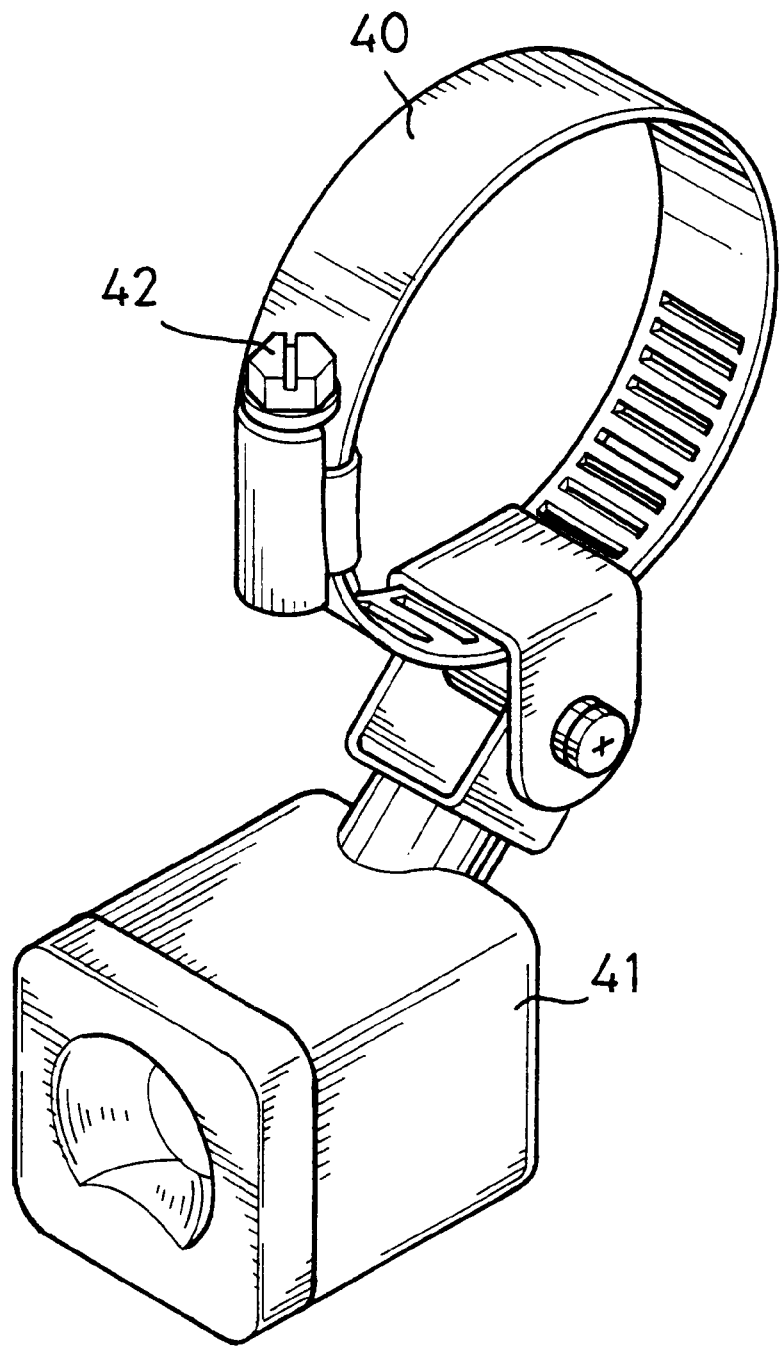
FIG. 4 is a perspective view of a conventional radar module.

Referring to FIGS. 1 and 2, the inventive clamp device includes a C-shaped body (10) having a pair of end lips (11) extending outward therefrom. The lips (11) are formed with aligned mounting holes (not numbered) for fixing the C-shaped body (10) on the additional rear bumper (20), by means of a bolt (12) that extends through the mounting holes and is threadedly engaged with a nut (13).

In addition, the C-shaped body (10) has a chamber (15) defined therein for accommodating the radar sensor (22).

Referring to FIG. 2, a channel (16) is defined in an outer periphery of the C-shaped body (10) and extends from the chamber (15) to one of the end lips (11). The channel (16) receives an electric cable (21) that electrically connects the radar sensor (22) to an alarm instrument (not shown) in the automobile. Preferably, the channel (16) terminates in an orifice (162) defined in the respective end lip (11), so that the cable (21) may extend through the orifice (162) into the automobile.

It is important that there must be sufficient friction between the C-shaped body (10) and the additional rear bumper (20) to prevent slippage therebetween. For this reason, the C-shaped body (10) is preferably made of a material with an appropriate coefficient of friction, such as plastics, rubber, etc., whereby the body (10) can be prevented from rotating with respect to the bumper (20).

From the above description, it is noted that the invention has the advantage that the C-shaped body (10) can securely hold the radar sensor (22) on the additional rear bumper (20) of the automobile without any undesired movement even when the automobile is travelling on a rough road.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A clamp device for holding a radar sensor (22) on a bumper of an automobile, comprising: a body (10) having a pair of end lips (11) extending therefrom, a channel (16) for receiving an electric cable (21) electrically connected to the radar sensor (22), and a chamber (15) defined therein for accommodating the radar sensor, said lips (11) having aligned mounting holes for fixing the body (10) on the bumper of said automobile.

2. The clamp device as claimed in claim 1, further comprising: an electric cable (21) received in said channel (16) and electrically connected to the radar sensor (22).

3. The clamp device as claimed in claim 1, wherein said body (10) is made of plastics.

4. The clamp device as claimed in claim 1, wherein said body (10) is made of rubber.

5. The clamp device as claimed in claim 1, wherein said body (10) is C-shaped.

6. The clamp device as claimed in claim 1, wherein said body (10) is held on a rear bumper (20) of an automobile.

* * * * *